United States Patent
Thomas et al.

(10) Patent No.: US 9,871,860 B2
(45) Date of Patent: *Jan. 16, 2018

(54) METHOD AND SYSTEM FOR PROVIDING REMOTE ACCESS TO A STATE OF AN APPLICATION PROGRAM

(71) Applicant: Calgary Scientific Inc., Calgary (CA)

(72) Inventors: Monroe Milas Thomas, Toronto (CA); David Bruce McFadzean, Toronto (CA); Michael Beauregard, Calgary (CA); Derek Scherger, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,515

(22) Filed: May 27, 2016

(65) Prior Publication Data

US 2016/0277495 A1 Sep. 22, 2016

Related U.S. Application Data

(63) Continuation of application No. 14/450,491, filed on Aug. 4, 2014, now Pat. No. 9,367,365, which is a
(Continued)

(51) Int. Cl.
*G06F 15/16* (2006.01)
*H04L 29/08* (2006.01)
(Continued)

(52) U.S. Cl.
CPC ............ *H04L 67/1095* (2013.01); *G06F 9/52* (2013.01); *G06F 19/00* (2013.01); *H04L 12/12* (2013.01); *H04L 67/42* (2013.01)

(58) Field of Classification Search
CPC . G06F 19/00; G06F 9/52; H04L 12/12; H04L 67/1095; H04L 67/42
See application file for complete search history.

(56) References Cited

U.S. PATENT DOCUMENTS

| 4,975,690 A | 12/1990 | Torres |
| 5,345,550 A | 9/1994 | Bloomfield |

(Continued)

FOREIGN PATENT DOCUMENTS

| CN | 102821413 | 12/2012 |
| EP | 0349463 | 1/1990 |

(Continued)

OTHER PUBLICATIONS

International Preliminary Report on Patentability and Written Opinion, dated May 31, 2016, received in connection International Patent Application No. PCT/US2014/064243.
(Continued)

*Primary Examiner* — Mohamed Wasel
(74) *Attorney, Agent, or Firm* — Meunier Carlin & Curfman LLC

(57) ABSTRACT

A method and system for providing remote access to a state of an application executing on a remote server. A client computer includes a client remote access program that is used to connect to a server remote access program. At the client computer, a client difference program having encoded data indicative of a change of a state of the application last received from the server computer is generated and transmitted to the server remote access program. At the server computer, the client difference program is executed to update the state of the application and a server difference program is generated having encoded a difference between the updated state of the application and the state of the application last sent to the client computer. The server difference program is transmitted to the client computer to update the state of the application since it was last received from the server computer.

20 Claims, 7 Drawing Sheets

Related U.S. Application Data continuation of application No. 12/592,473, filed on Nov. 25, 2009, now Pat. No. 8,799,354.

(60) Provisional application No. 61/193,423, filed on Nov. 26, 2008.

(51) Int. Cl.
*G06F 9/52* (2006.01)
*G06F 19/00* (2011.01)
*H04L 12/12* (2006.01)
*H04L 29/06* (2006.01)

(56) References Cited

U.S. PATENT DOCUMENTS

| | | | |
|---|---|---|---|
| 5,555,003 | A | 9/1996 | Montgomery et al. |
| 5,742,778 | A | 4/1998 | Hao et al. |
| 5,844,553 | A | 12/1998 | Hao et al. |
| 5,870,759 | A * | 2/1999 | Bauer ............... G06F 17/30578 |
| 5,909,545 | A | 6/1999 | Frese, II et al. |
| 5,920,311 | A | 7/1999 | Anthias |
| 5,978,842 | A * | 11/1999 | Noble ............... G06F 17/3089 |
| | | | 707/999.01 |
| 6,045,048 | A | 4/2000 | Wilz et al. |
| 6,061,689 | A | 5/2000 | Chang et al. |
| 6,075,531 | A | 6/2000 | DeStefano |
| 6,141,698 | A | 10/2000 | Krishnan et al. |
| 6,145,098 | A | 11/2000 | Nouri et al. |
| 6,253,228 | B1 | 6/2001 | Ferris et al. |
| 6,343,313 | B1 | 1/2002 | Salesky et al. |
| 6,453,334 | B1 | 9/2002 | Vinson et al. |
| 6,453,356 | B1 | 9/2002 | Sheard et al. |
| 6,570,563 | B1 * | 5/2003 | Honda ............... G06T 19/00 |
| | | | 345/419 |
| 6,601,233 | B1 | 7/2003 | Underwood |
| 6,792,607 | B1 | 9/2004 | Burd et al. |
| 6,909,545 | B2 | 6/2005 | Takano et al. |
| 6,918,113 | B2 | 7/2005 | Patel et al. |
| 6,976,077 | B1 | 12/2005 | Lehew et al. |
| 7,065,568 | B2 | 6/2006 | Bracewell et al. |
| 7,069,227 | B1 * | 6/2006 | Lintel, III ............. G06F 19/328 |
| | | | 705/2 |
| 7,073,059 | B2 | 7/2006 | Worely et al. |
| 7,149,761 | B2 | 12/2006 | Cooke et al. |
| 7,167,893 | B1 | 1/2007 | Malone et al. |
| 7,174,504 | B2 | 2/2007 | Tsao |
| 7,181,686 | B1 | 2/2007 | Bahrs |
| 7,240,162 | B2 | 7/2007 | de Vries |
| 7,246,063 | B2 | 7/2007 | James et al. |
| 7,320,131 | B1 | 1/2008 | O'Toole, Jr. |
| 7,343,310 | B1 | 3/2008 | Stender |
| 7,350,151 | B1 * | 3/2008 | Nakajima ............. G06F 9/4443 |
| | | | 715/205 |
| 7,418,711 | B1 | 8/2008 | Lee et al. |
| 7,451,196 | B1 | 11/2008 | de Vries et al. |
| 7,577,751 | B2 | 8/2009 | Vinson et al. |
| 7,620,901 | B2 | 11/2009 | Carpenter et al. |
| 7,647,370 | B1 | 1/2010 | Liu et al. |
| 7,650,444 | B2 | 1/2010 | Dirstine et al. |
| 7,656,799 | B2 | 2/2010 | Samuels et al. |
| 7,706,399 | B2 | 4/2010 | Janczak |
| 7,725,331 | B2 * | 5/2010 | Schurenberg .......... G06Q 10/10 |
| | | | 705/2 |
| 7,802,183 | B1 * | 9/2010 | Essin .................. G06Q 10/087 |
| | | | 705/2 |
| 7,831,919 | B1 | 11/2010 | Viljoen et al. |
| 7,921,078 | B2 * | 4/2011 | McCuller ............... H04L 67/06 |
| | | | 707/625 |
| 7,941,488 | B2 * | 5/2011 | Goodman ............. G06Q 10/107 |
| | | | 370/352 |
| 7,966,572 | B2 | 6/2011 | Matthews et al. |
| 8,024,523 | B2 | 9/2011 | de Vries et al. |
| 8,261,345 | B2 | 9/2012 | Hitomi et al. |
| 8,356,252 | B2 | 1/2013 | Raman et al. |
| 8,359,591 | B2 | 1/2013 | de Vries et al. |
| 8,509,230 | B2 | 8/2013 | Vinson et al. |
| 8,527,706 | B2 | 9/2013 | de Vries et al. |
| 8,572,178 | B1 | 10/2013 | Frazzini et al. |
| 8,606,952 | B2 | 12/2013 | Pasetto et al. |
| 8,607,158 | B2 | 12/2013 | Molander et al. |
| 8,627,081 | B2 * | 1/2014 | Grimen ............... H04N 7/1675 |
| | | | 713/168 |
| 8,667,054 | B2 | 3/2014 | Tahan |
| 8,924,512 | B2 | 12/2014 | Stoyanov |
| 2001/0047393 | A1 | 11/2001 | Amer et al. |
| 2002/0032751 | A1 | 3/2002 | Bharadwaj |
| 2002/0032804 | A1 | 3/2002 | Hunt |
| 2002/0092029 | A1 | 7/2002 | Smith |
| 2003/0014735 | A1 | 1/2003 | Achlioptas et al. |
| 2003/0023670 | A1 | 1/2003 | Walrath |
| 2003/0065738 | A1 | 4/2003 | Yang et al. |
| 2003/0120324 | A1 | 6/2003 | Osborn et al. |
| 2003/0120762 | A1 | 6/2003 | Yepishin et al. |
| 2003/0149941 | A1 | 8/2003 | Tsao |
| 2003/0163514 | A1 | 8/2003 | Waldschmidt |
| 2003/0184584 | A1 | 10/2003 | Vachuska et al. |
| 2003/0208472 | A1 | 11/2003 | Pham |
| 2004/0015842 | A1 | 1/2004 | Nanivadekar et al. |
| 2004/0029638 | A1 * | 2/2004 | Hytcheson ............. A63F 13/12 |
| | | | 463/42 |
| 2004/0039742 | A1 | 2/2004 | Barsness et al. |
| 2004/0068516 | A1 * | 4/2004 | Lee .................. G06F 17/30194 |
| 2004/0106916 | A1 | 6/2004 | Quaid et al. |
| 2004/0117804 | A1 * | 6/2004 | Scahill ................... G06F 9/542 |
| | | | 719/320 |
| 2004/0162876 | A1 | 8/2004 | Kohavi |
| 2004/0183827 | A1 | 9/2004 | Putterman et al. |
| 2004/0236633 | A1 | 11/2004 | Knauerhase et al. |
| 2004/0243919 | A1 | 12/2004 | Muresan et al. |
| 2004/0249885 | A1 | 12/2004 | Petropoulakis et al. |
| 2005/0005024 | A1 | 1/2005 | Samuels et al. |
| 2005/0010871 | A1 | 1/2005 | Ruthfield et al. |
| 2005/0021687 | A1 | 1/2005 | Anastassopoulos et al. |
| 2005/0050229 | A1 | 3/2005 | Comeau et al. |
| 2005/0138631 | A1 | 6/2005 | Bellotti et al. |
| 2005/0188046 | A1 | 8/2005 | Hickman et al. |
| 2005/0188313 | A1 | 8/2005 | Matthews et al. |
| 2005/0240906 | A1 | 10/2005 | Kinderknecht et al. |
| 2006/0004874 | A1 * | 1/2006 | Hutcheson ............. A63F 13/34 |
| 2006/0026006 | A1 | 2/2006 | Hindle |
| 2006/0031377 | A1 | 2/2006 | Ng et al. |
| 2006/0036770 | A1 | 2/2006 | Hosn et al. |
| 2006/0101397 | A1 | 5/2006 | Mercer et al. |
| 2006/0130069 | A1 | 6/2006 | Srinivasan et al. |
| 2006/0231175 | A1 | 10/2006 | Vondracek et al. |
| 2006/0236328 | A1 | 10/2006 | DeWitt |
| 2006/0258462 | A1 | 11/2006 | Cheng et al. |
| 2006/0265689 | A1 | 11/2006 | Kuznetsov et al. |
| 2006/0271563 | A1 | 11/2006 | Angelo et al. |
| 2006/0288171 | A1 | 12/2006 | Tsien |
| 2006/0294418 | A1 | 12/2006 | Fuchs |
| 2007/0024645 | A1 | 2/2007 | Purcell et al. |
| 2007/0047535 | A1 | 3/2007 | Varma |
| 2007/0067754 | A1 | 3/2007 | Chen et al. |
| 2007/0079244 | A1 | 4/2007 | Brugiolo |
| 2007/0112880 | A1 * | 5/2007 | Yang ................. G06F 17/30581 |
| 2007/0120763 | A1 | 5/2007 | De Paepe et al. |
| 2007/0130292 | A1 | 6/2007 | Tzruya et al. |
| 2007/0136677 | A1 | 6/2007 | Agarwal |
| 2007/0203944 | A1 | 8/2007 | Batra et al. |
| 2007/0208718 | A1 | 9/2007 | Javid et al. |
| 2007/0226636 | A1 | 9/2007 | Carpenter et al. |
| 2007/0244990 | A1 | 10/2007 | Wells |
| 2007/0256073 | A1 | 11/2007 | Truong et al. |
| 2007/0282951 | A1 | 12/2007 | Selimis et al. |
| 2008/0134211 | A1 | 6/2008 | Cui |
| 2008/0146194 | A1 * | 6/2008 | Yang ..................... G06F 21/41 |
| | | | 455/411 |
| 2008/0183190 | A1 | 7/2008 | Adcox et al. |
| 2008/0313282 | A1 | 12/2008 | Warila et al. |
| 2009/0044171 | A1 | 2/2009 | Avadhanula |
| 2009/0080523 | A1 * | 3/2009 | McDowell ............. H04N 19/51 |
| | | | 375/240.15 |

(56) References Cited

U.S. PATENT DOCUMENTS

| | | |
|---|---|---|
| 2009/0089742 A1 | 4/2009 | Nagulu et al. |
| 2009/0119644 A1 | 5/2009 | de Vries et al. |
| 2009/0209239 A1* | 8/2009 | Montesdeoca ........ H04M 3/493 455/414.2 |
| 2009/0217177 A1 | 8/2009 | DeGrazia |
| 2010/0061238 A1 | 3/2010 | Godbole et al. |
| 2010/0077058 A1 | 3/2010 | Messer |
| 2010/0150031 A1 | 6/2010 | Allen et al. |
| 2010/0174773 A1 | 7/2010 | Penner et al. |
| 2010/0205147 A1* | 8/2010 | Lee ................... G06F 17/30575 707/620 |
| 2010/0223566 A1 | 9/2010 | Holmes et al. |
| 2010/0268813 A1 | 10/2010 | Pahlavan et al. |
| 2011/0138283 A1 | 6/2011 | Marston |
| 2011/0157196 A1 | 6/2011 | Nave et al. |
| 2011/0184993 A1 | 7/2011 | Chawla et al. |
| 2011/0213830 A1 | 9/2011 | Lopez et al. |
| 2011/0222442 A1 | 9/2011 | Cole et al. |
| 2011/0252152 A1 | 10/2011 | Sherry et al. |
| 2012/0030275 A1 | 2/2012 | Boller et al. |
| 2012/0084713 A1 | 4/2012 | Desai et al. |
| 2012/0090004 A1 | 4/2012 | Jeong |
| 2012/0133675 A1* | 5/2012 | McDowell ............. H04N 19/51 345/629 |
| 2012/0154633 A1 | 6/2012 | Rodriguez |
| 2012/0221792 A1 | 8/2012 | de Vries et al. |
| 2012/0226742 A1 | 9/2012 | Momchilov et al. |
| 2012/0245918 A1 | 9/2012 | Overton et al. |
| 2012/0246225 A1 | 9/2012 | Lemire et al. |
| 2012/0324032 A1 | 12/2012 | Chan |
| 2013/0007227 A1 | 1/2013 | Hitomi et al. |
| 2013/0031618 A1 | 1/2013 | Momchilov |
| 2013/0046816 A1 | 2/2013 | Thomas et al. |
| 2013/0054679 A1 | 2/2013 | Jooste |
| 2013/0070740 A1 | 3/2013 | Yovin |
| 2013/0117474 A1 | 5/2013 | Ajanovic et al. |
| 2013/0147845 A1 | 6/2013 | Xie et al. |
| 2013/0159062 A1 | 6/2013 | Stiehl |
| 2013/0179962 A1 | 7/2013 | Arai et al. |
| 2013/0262566 A1 | 10/2013 | Stephure et al. |
| 2013/0346482 A1 | 12/2013 | Holmes |
| 2014/0214925 A1 | 7/2014 | Thomas et al. |
| 2014/0240524 A1 | 8/2014 | Julia et al. |
| 2015/0156133 A1 | 6/2015 | Leitch et al. |
| 2015/0163292 A1 | 6/2015 | Lemire et al. |

FOREIGN PATENT DOCUMENTS

| | | |
|---|---|---|
| EP | 1422901 | 5/2004 |
| JP | 2007/084744 | 3/1995 |
| JP | 2002/055870 | 2/2002 |
| JP | 2004-287758 | 10/2004 |
| JP | 2005/031807 | 2/2005 |
| JP | 2005/521946 | 7/2005 |
| JP | 2008-099055 | 4/2008 |
| JP | 4405812 | 1/2010 |
| JP | 2010-256972 | 11/2010 |
| RU | 2295752 | 3/2007 |
| RU | 2298287 | 4/2007 |
| RU | 2305860 | 9/2007 |
| WO | 1998/058478 | 12/1998 |
| WO | 2001/016724 | 3/2001 |
| WO | 2002/009106 | 1/2002 |
| WO | 2003/032569 | 4/2003 |
| WO | 2003/083684 | 10/2003 |
| WO | 2010/060206 | 6/2010 |
| WO | 2010/088768 | 8/2010 |
| WO | 2010/127327 | 11/2010 |
| WO | 2012/127308 | 9/2012 |
| WO | 2013/024342 | 2/2013 |
| WO | 2013/024343 | 2/2013 |
| WO | 2013/109984 | 7/2013 |
| WO | 2013/128284 | 9/2013 |
| WO | 2013/153439 | 10/2013 |
| WO | 2015/080845 | 6/2015 |

OTHER PUBLICATIONS

Coffman, Daniel, et al., "A Client-Server Architecture for State-Dependent Dynamic Visualizations on the Web," IBM T.J. Watson Research Center, 2010, 10 pages.

Fraser, N., "Differential Synchronization," Google, Mountain View, CA, Jan. 2009, 8 pages.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Microsoft Computer Dictionary, Microsoft Press, $5^{th}$ Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

Remote Desktop Services (RDS), Remote App, retrieved on May 4, 2014 from http://en.wikipedia.org/wiki/Remote_Desktop_Services, 9 pages.

Remote Desktop Services (RDS), Windows Desktop Sharing, retrieved on May 4, 2014 from http://en.wikipedia.org/wiki/Remote_Desktop_Services, 9 pages.

European Search Report, dated Sep. 29, 2015, received in connection with related European Application No. 12824363.1.

European Search Report, dated Sep. 1, 2015, received in connection with related European Application No. 12824077.7.

European Search Report, dated Jul. 5, 2012, received in connection with European Application No. 10738183.2.

European Search Report, dated Mar. 3, 2015, received in connection with European Application No. 09828497.9.

European Search Report, dated Jun. 2, 2014, received in connection with European Application No. 12760310.8.

Search Report and Written Opinion, dated Nov. 16, 2015, received in connection with SG Application No. 2013087150.

International Search Report, dated Feb. 19, 2010, received in connection with International Patent Application No. PCT/CA2009/001704.

International Preliminary Report on Patentability and Written Opinion, dated May 31, 2011, received in connection with International Patent Application No. PCT/CA2009/001704.

International Search Report, dated May 12, 2010, received in connection with International Patent Application No. PCT/CA2010/000154.

International Preliminary Report on Patentability and Written Opinion, dated Aug. 9, 2011, received in connection with International Patent Application No. PCT/CA2010/000154.

International Search Report and Written Opinion, dated Jul. 31, 2012, received in connection with International Patent Application No. PCT/IB2012/000562.

International Preliminary Report on Patentability and Written Opinion, dated Sep. 24, 2013, received in connection with International Patent Application No. PCT/IB2012/000562.

International Search Report, dated Dec. 20, 2012, received in connection with International Patent Application No. PCT/IB2012/001589.

International Preliminary Report on Patentability and Written Opinion, dated Feb. 18, 2014, received in connection with International Patent Application No. PCT/IB2012/001589.

International Search Report, dated Dec. 28, 2012, received in connection with International Patent Application No. PCT/IB2012/001590.

International Preliminary Report on Patentability and Written Opinion, dated Feb. 18, 2014, received in connection with International Patent Application No. PCT/IB2012/001590.

(56) References Cited

OTHER PUBLICATIONS

International Search Report and Written Opinion, dated Aug. 21, 2013, received in connection with International Patent Application No. PCT/IB2013/000676.
International Preliminary Report on Patentability and Written Opinion, dated Oct. 14, 2014, received in connection with International Patent Application No. PCT/IB2013/000676.
International Search Report and Written Opinion, dated Jul. 31, 2013, received in connection with International Patent Application No. PCT/IB2013/000720.
International Preliminary Report on Patentability and Written Opinion, dated Sep. 2, 2014, received in connection with International Patent Application No. PCT/IB2013/000720.
International Search Report and Written Opinion, dated Mar. 19, 2015, received in connection with International Patent Application No. PCT/US2014/064243.

* cited by examiner

METHOD AND SYSTEM FOR PROVIDING REMOTE ACCESS TO A STATE OF AN APPLICATION PROGRAM

CROSS-REFERENCE TO RELATED APPLICATIONS

This application is a continuation of U.S. patent application Ser. No. 14/450,491 filed Aug. 4, 2014, entitled "METHOD AND SYSTEM FOR PROVIDING REMOTE ACCESS TO A STATE OF AN APPLICATION PROGRAM," which is a continuation of U.S. patent application Ser. No. 12/592,473, filed Nov. 25, 2009, entitled "METHOD AND SYSTEM FOR PROVIDING REMOTE ACCESS TO A STATE OF AN APPLICATION PROGRAM," now U.S. Pat. No. 8,799,354, and claims the benefit of priority to U.S. Provisional Patent Application No. 61/193,423 filed Nov. 26, 2008. The disclosure of each of the aforementioned patent applications is incorporated herein by reference in its entirety.

FIELD OF THE INVENTION

The instant invention relates to computer networking and in particular to a method and system for providing remote access to a state of an application via a computer network.

BACKGROUND

Healthcare institutions, such as hospitals and diagnostic clinics, utilize information systems such as Hospital Information Systems (HIS), Radiology Information Systems (RIS), Clinical Information Systems (CIS), Picture Archive and Communication Systems (P ACS), Library Information Systems (LIS), Electronic Medical Records (EMR), to name a few. Information stored and processed in such systems includes, for example, patient medical histories, imaging data, test results, diagnosis information, management information, and scheduling information. The information is stored centrally or divided at a plurality of locations of a computer network—typically comprising a client-server architecture. Healthcare practitioners access the patient information or other information at various time instants and locations using sophisticated software application programs to gather, analyze, manipulate, and store data.

For example, using a PACS workstation a radiologist performs an image reading for a diagnosis based on content of diagnostic images and reports the results electronically in a patient application file. Because of the large volume of data and intensive computing requirements, the software used to perform this task typically requires dedicated workstation hardware and high bandwidth network access to the diagnostic images. As a consequence, there is limited or no access to the diagnostic information and analysis capability off-site from the P ACS workstation. This limits the ability of radiologists, technicians, and other specialists who are not on-site to be able to gain access to the necessary software and data to provide timely diagnosis, for example, in an urgent situation.

Presently, this problem is typically overcome by providing remote network access to the screen or console of the workstation hardware, or by downloading sensitive data such as, for example, diagnostic data, to a remote system. In the first case, remote access software does not have any special knowledge of the application programs that are executed and are not able to optimize the presentation of the display of the application program to the user based on the state of the application program—resulting in inefficient use of network bandwidth and poor performance for the remote user. In the second case, the transmission of patient related information to an uncontrolled remote site is a security risk for such sensitive information, and furthermore, in the case of diagnostic imaging data, requires transmission of large amounts of information which is beyond the capacity of many networks.

SUMMARY OF EMBODIMENTS OF THE INVENTION

In accordance with embodiments of the present invention there is provided a method for providing remote access to a state of an application. The method may include providing remote access to an application program being executed on a server computing device by establishing over a network, a remote connection at the server computing device with a client computing device to enable the remote access to the application program; communicating, over the remote connection, a difference program containing data representing a change in a state of the application made by either execution of the application program or the client computing device, the difference program capturing changes in the state of the application program since the state of the application was last received by the server computing device or the client computing device; and synchronizing, between the server computing device and the client computing device, the change in the state of the application using the difference program.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

While embodiments of the invention will be described for patient application files in a clinical environment only for the sake of simplicity, it will become evident to those skilled in the art that the embodiments of the invention are not limited thereto, but are applicable in numerous other fields where users remotely access a state of an application program via a computer network.

Figure 1:
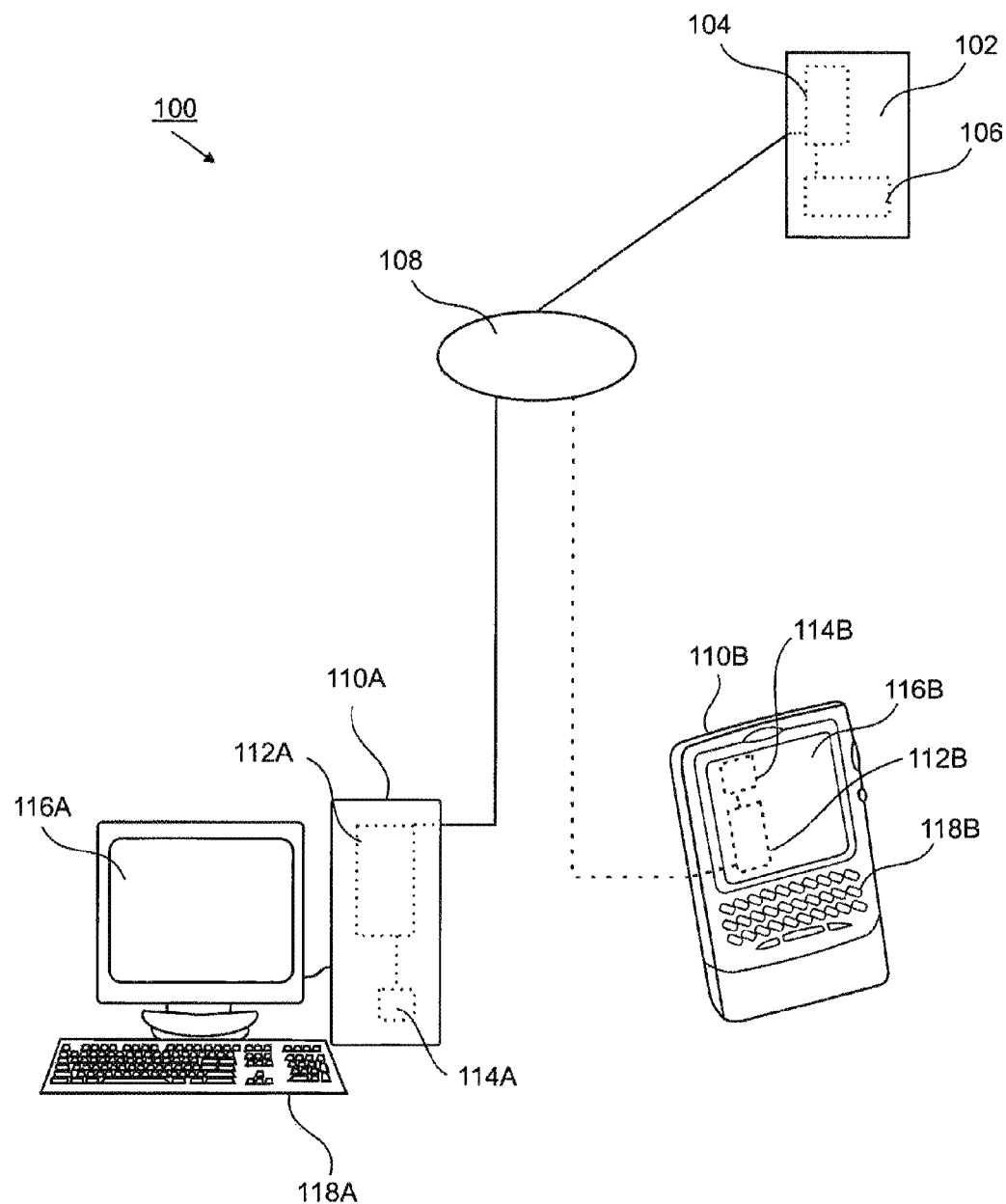
FIG. 1 is a simplified block diagram of a system for providing remote access to a state of an application according to a preferred embodiment of the invention.

Referring to FIG. 1, a system 100 for providing remote access to the state of an application according to a preferred embodiment of the invention is shown. The system comprises a plurality of client computers 110A, 110B—for example, workstations, personal computers, laptop computers, and/or wireless handheld devices—connected via a communication network 108 to a server computer 102—for example, a central computer or a high performance workstation. For example, in a clinical environment numerous tasks executed on the system 100 are related to: viewing medical images of a patient and entering a diagnostic report into a respective patient application file; and for entering other information such as scheduling information of the patient's appointments with medical practitioners. The communication network 108 comprises, for example, a Local Area Network (LAN) connecting the client computers with one or more server computers within an organization such as, for example, a hospital. Alternatively, the communication network 108 comprises a Wide Area Network (WAN) or the Internet connecting client computers of various organizations such as, for example, hospitals, diagnostic clinics, and family physicians offices.

In the system 100 an application program for performing an application associated therewith is executed on processor 104 of the server computer 102, for example, by executing executable commands stored in memory 106. For example, applications enable: viewing and modifying of medical images, viewing and modifying of a patient file, entering a diagnostic report, and scheduling a patient's appointments. A state of an application is changed, for example, when a user changes information in a patient file or requests a different view of a medical image.

For example, using the system 100 a radiologist is enabled to perform an image reading for a diagnosis by remotely accessing an imaging application executed on a dedicated PACS workstation and to enter a report into a patient file by remotely accessing a patient file application.

Typically, an application such as, for example, the patient file application is processed at different client computers 110A, 110B connected via the communication network 108 to the server computer 102. For example, at client computer 110B a medical practitioner enters his diagnosis of a medical image into the patient application file while at client computer 110A a health care worker enters scheduling information for an appointment into the patient application file. The processing of the same patient file application at two different client computers 110A, 110B results in different states of the patient file application.

The system 100 provides remote access as well as synchronizes the states of an application by executing a method for providing remote access to the state of an application according to embodiments of the invention, as will be described herein below. The method for providing remote access to the state of an application is performed, for example, by executing a remote access program on processors 112A, 112B. For example, the remote access program is performed by executing executable commands stored in memory 114A, 114B. The remote access program is in communication with a remote server access program executed on the processor 104 of the server computer 102, which is in communication with the application program. Alternatively, the remote access program is in direct communication with the application program. When performing the method for providing remote access to the state of an application, the processor of the server computer 102 communicates with respective processors 112A, 112B of the client computers 110A, 110B using standard communication protocols such as, for example, Hyper Text Transfer Protocol (HTTP)—of the communication network 108, which are well known to those skilled in the art.

In the method for providing remote access to the state of an application, "view data" of the state of the application are generated and transmitted in a fashion according to hardware capabilities of the client computer—for example, processing capacity, memory size, type of graphical display, and type of user interface. For example, "view data" generated and transmitted for a personal computer are different from "view data" generated and transmitted for a wireless handheld device. For example, during a remote access a user modifies data of a patient file. First, "view data" indicative of the data of the patient file are generated at the server computer and transmitted to the client computer where the "view data" are displayed. The user using a user interface of the client computer then provides data indicative of a change of data of the patient file as "view data" which are then encoded and transmitted to the server computer. The server computer then changes the state of the application in dependence upon the data indicative of a change provided by the user and the application then stores data in dependence thereupon in the patient file stored in a database. Using "view data" enables presentation of the state of an application without transmitting sensitive and/or voluminous diagnostic data and avoids replicating of the application's data processing on the client computer.

Figure 2:
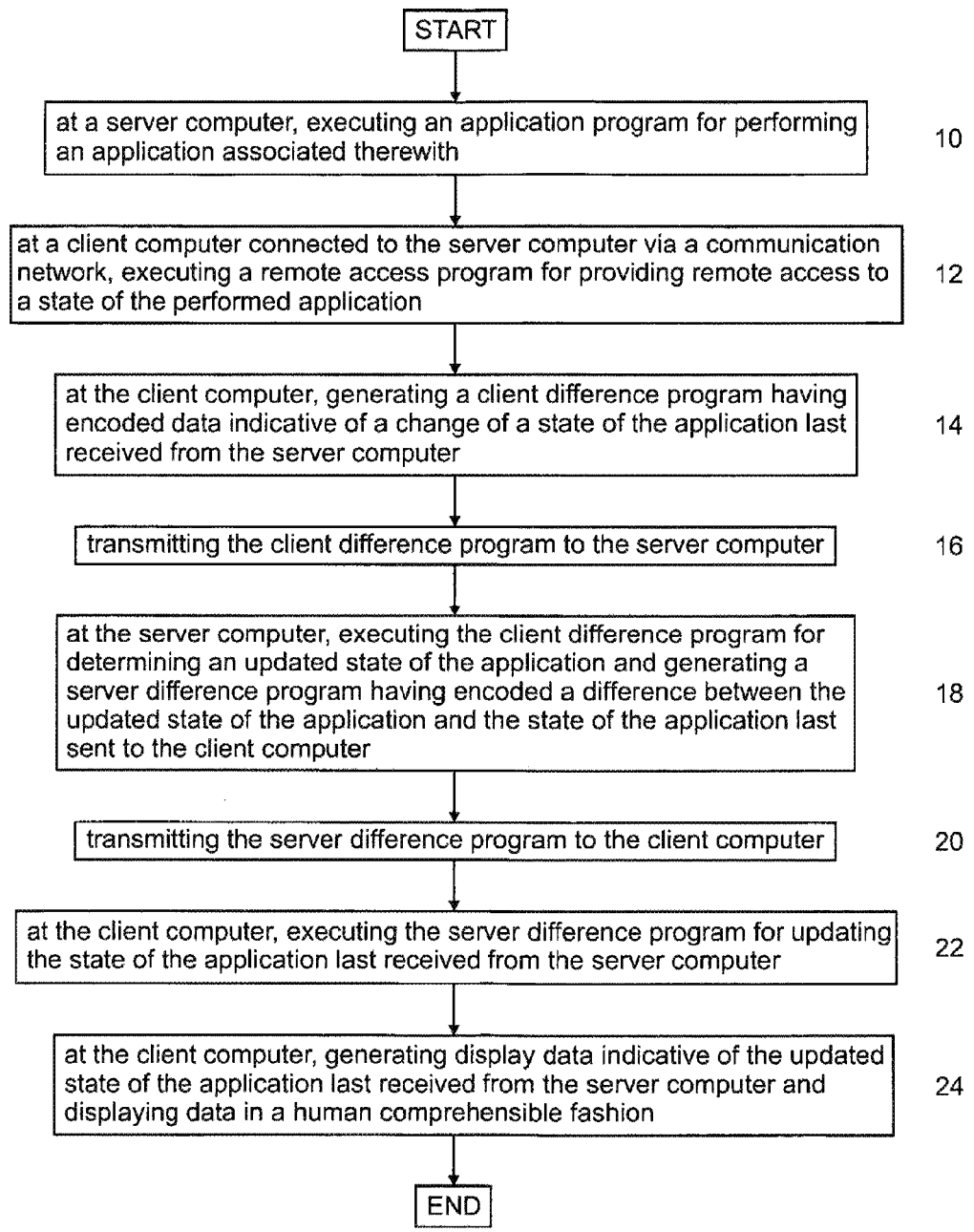
FIGS. 2 to 4 are simplified flow diagrams of a method for providing remote access to a state of an application according to a preferred embodiment of the invention.

Referring to FIG. 2, a method for providing remote access to the state of an application according to a preferred embodiment of the invention is shown. At the server computer 102 an application program for performing an application associated therewith is executed—10—on processor 104. At client computer 110A connected to the server computer 102, via the communication network 108 a remote access program is executed—12—on processor 112A for providing remote access to a state of the performed application. At the client computer 110A a client difference program is generated—14. The client difference program has encoded data indicative of a change of a state of the application last received from the server computer 102. The data indicative of a change of a state of the application are, for example, received from a user interface 118A, 118B of the client computer 110A, 110B, respectively.

The difference programs comprise executable commands for execution by a processor. The encoded data are indicative of: a path to the change in the state of the application; a type of the change; and a value of the change. The type of change is, for example, a "modification", a "deletion", or an "insertion", with the value for deletion changes being empty. An example of a difference program is:

Path="Patient/Name/First"
Type="Modification"
Value="Jane"
Path="Patient/Hobby"
Type="Insertion"
Value="Knitting"
Path="Patient/Career"
Type="Deletion"
Value=" "

The client difference program is then transmitted—16—to the server computer 102 via the communication network 108. At the server computer 102 the client difference program is executed—18—for determining an updated state of the application followed by generating a server difference program. The server difference program has encoded a difference between the updated state of the application and the state of the application last sent to the client computer, 110A. This difference also captures changes, for example, received from another client computer—for example, client computer 110B—or generated due to execution of the application program in dependence upon the executed client difference program for determining the updated state of the application. The server difference program is then transmitted—20—to the client computer 110A via the communication network 108. At the client computer 110A the server difference program is executed—22—for updating the state of the application last received from the server computer 102. Display data indicative of the updated state of the application last received from the server computer 102 are generated—24—and displayed in a human comprehensible fashion on display 116A. Optionally, step 24 is omitted, for example, in situations where the updated state of the application does not affect the data displayed on the display 116A.

Preferably, a remote server access program is executed on the processor 104 of the server computer 102 for executing the client difference program; communicating with the application program for determining the updated state of the application; and generating the server difference program. Provision of the remote server access program enables remote access to off-the-shelf application programs, increases substantially flexibility for the provision of the remote access absent modifications of the application program, and substantially facilitates implementation of the remote access as a retrofit. Alternatively, the application program is enabled to perform the operations of the remote server access program.

Further preferably, the method for providing' remote access to the state of an application enables limited access to a predetermined portion of the state of the application. For example, the limited access is enabled for:

meeting hardware capabilities for example, processing capacity, memory size, type of graphical display, and type of user interface—of the client computer—for example, the hardware capabilities of a personal computer are substantially different to the hardware capabilities of a wireless handheld device;

being compatible with different operating systems of different client computers; and, implementing user access restrictions to information for providing different users with different access to the state of an application—for example, an administrative user for scheduling a patient's appointments is prevented from accessing diagnostic information of the patient.

Further preferably, the method for providing remote access to the state of an application enables remote access for a plurality of client computers 110A, 110B, which are, for example, simultaneously, connected to the server computer 102 via the communication network 108 for accessing the state of a same application.

Figure 3:
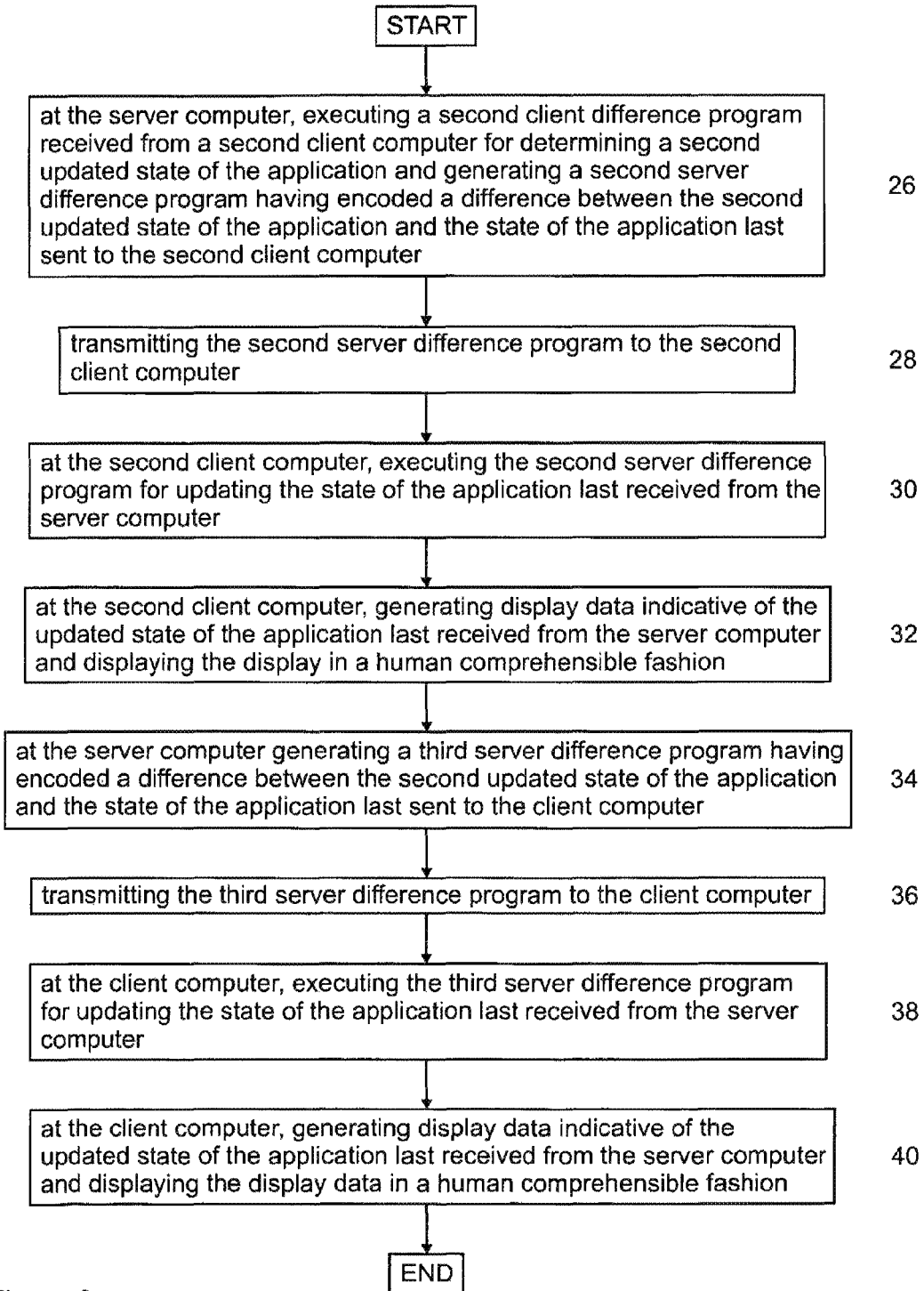

As illustrated in FIG. 3, upon receipt a second client difference program received from a second client computer 110B is executed—26—at the server computer 102 for determining a second updated state of the application followed by generating a second server difference program. The second server difference program has encoded a difference between the second updated state of the application and the state of the application last sent to the second client computer. The second server difference program is then transmitted—28—to the second client computer 110B via the communication network 108. At the second client computer 110B the second server difference program is executed—30—for updating the state of the application last received from the server computer 102. Display data indicative of the updated state of the application last received from the server computer 102 are generated—32—and displayed in a human comprehensible fashion on display 116B. Optionally, step 32 is omitted, for example, in situations where the updated state of the application does not affect the data displayed on the display 116B.

At the server computer 102 a third server difference program is generated 34. The third server difference program has encoded a difference between the second updated state of the application and the state of the application last sent to the client computer 110A. The third server difference program is then transmitted—36—to the client computer 110A via the communication network 108. At the client computer 110A the third server difference program is executed—38—for updating the state of the application last received from the server computer 102. Display data indicative of the updated state of the application last received from the server computer 102 are generated—40—and displayed in a human comprehensible fashion on display 116A. Optionally, step 40 is omitted, for example, in situations where the updated state of the application does not affect the data displayed on the display 116A. Preferably, the steps 34 to 40 are executed simultaneously to the execution of steps 26 to 32. Alternatively, the steps 34 to 40 are omitted and the changes received from the second client computer 110B are provided to the client computer 110A after receipt of a client difference program from the client computer 110A.

Figure 4:
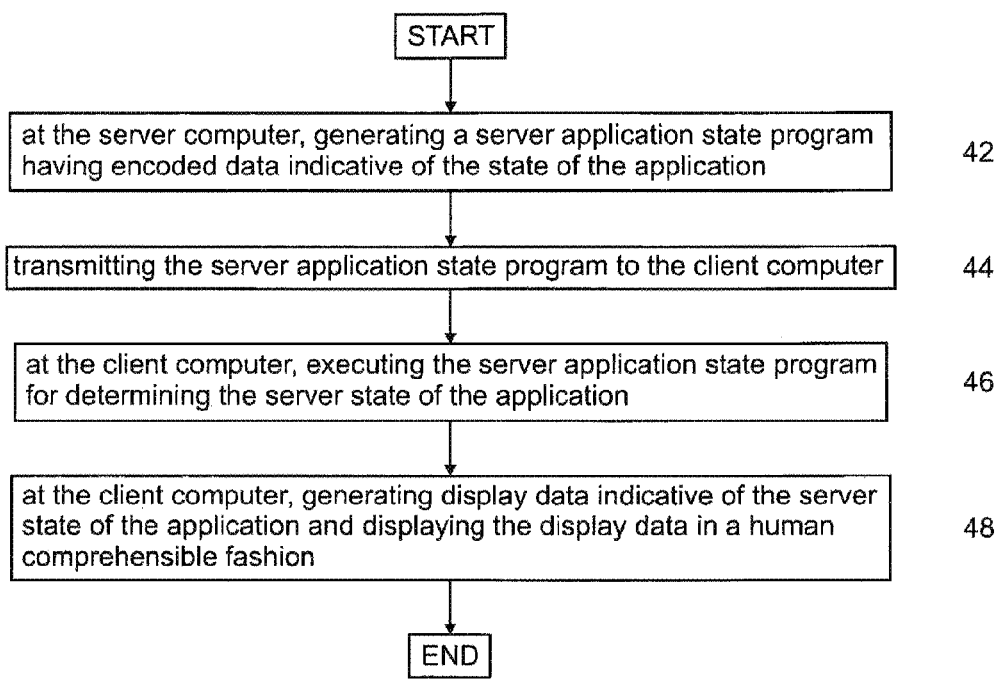

Upon initiation of the remote access for the client computer a state of the application is provided as illustrated in FIG. 4. Upon receipt of a request from the client computer 110A for the state of the application a server application state program is generated—42—at the server computer 102. The server application state program has encoded data indicative of the state of the application. The server application state program is then transmitted—44—to the client computer 110A via the communication network 108. At the client computer 110A the server application state program is executed—46—for determining the server state of the application. Display data indicative of the server state of the application are generated—48—and displayed in a human comprehensible fashion on display 116A. Optionally, the steps 42 to 48 are also performed during provision of the remote access to ensure a provision of a same state of the application at the server computer 102 and the client computer 110A. For example, the steps 42 to 48 are performed in predetermined time intervals or after data loss during transmission. Further optionally, step 48 is omitted, for example, in situations where the updated state of the application does not affect the data displayed on the display 116A.

Figure 5:
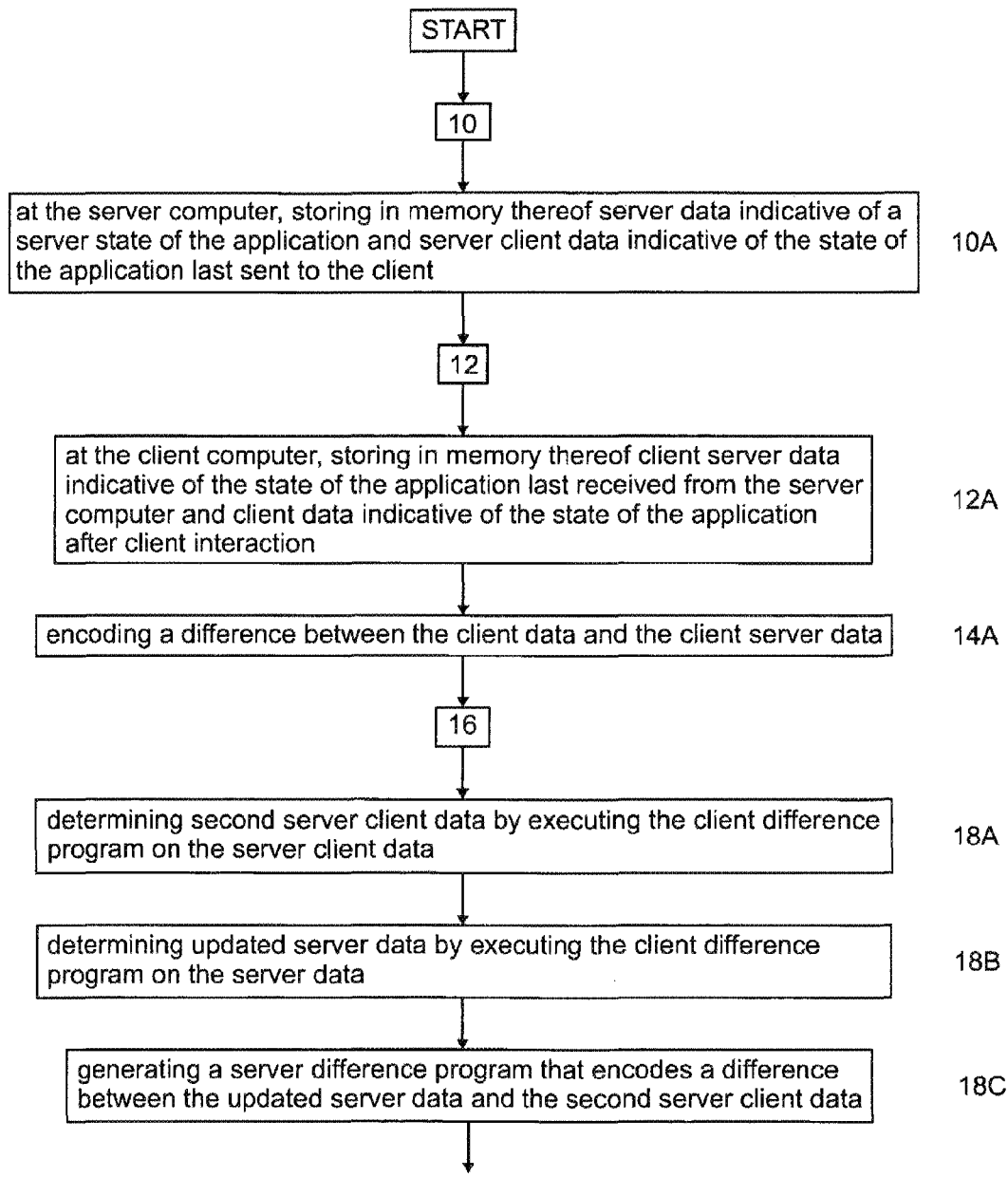
FIG. 5 is a simplified flow diagram of a preferred implementation of the method for providing remote access to a state of an application illustrated in FIG. 2.
Figure 5:
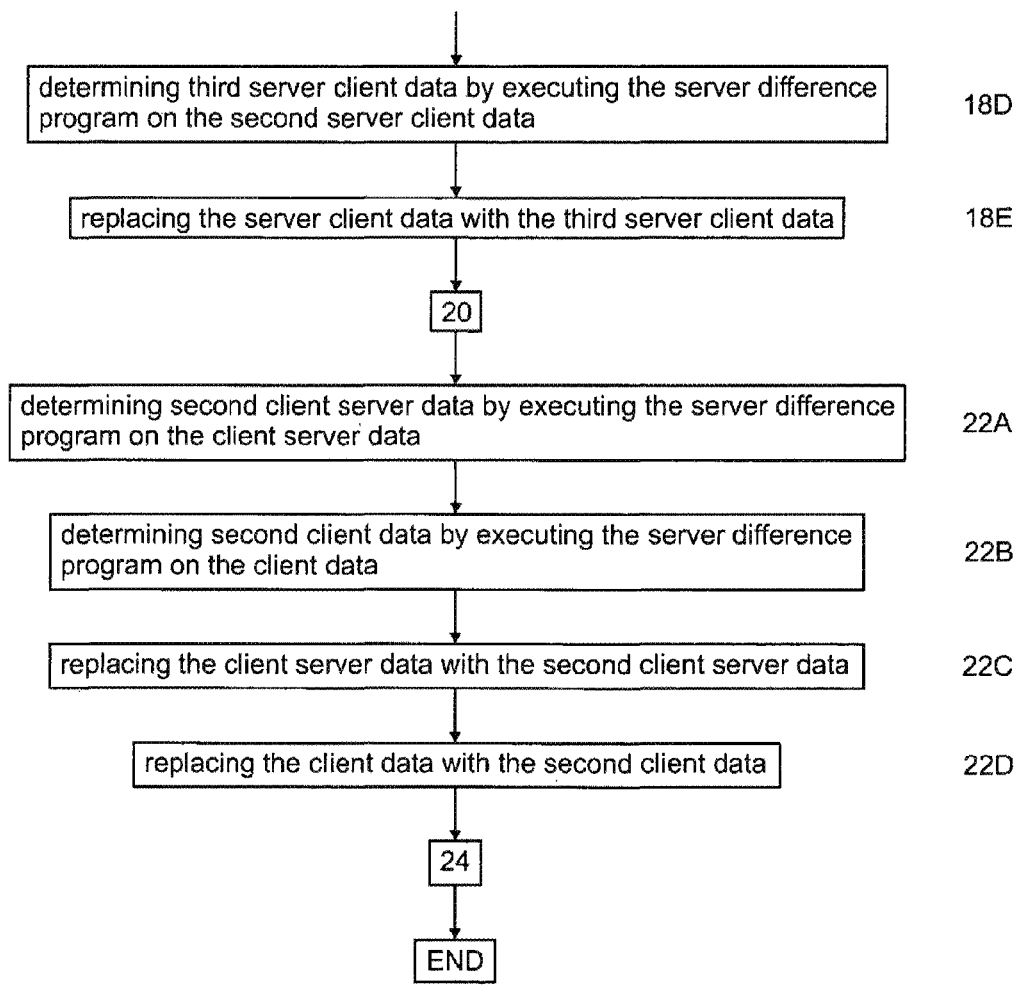

Referring to FIG. 5, a preferred implementation of the method for providing remote access to the state of an application is illustrated—with reference to the method shown in FIG. 2. In the memory 106 of the server computer 102 data indicative of a state of the application such as, for example, a patient file application, are stored—10A—in two states thereof: server data indicative of the server state of the application—the state of the application at the server (and possibly changed by the server); and, server client data indicative of the state of the application last sent to the client computer 110A. In the memory 114A of the client computer 110A data indicative of a state of the application are stored—

12A—in two states thereof: client server data indicative of the state of the application last received from the server computer 102; and, client data indicative of the state of the application after client interaction. In step 14 a difference between the state of the application after client interaction and the state of the application last received from the server computer is encoded—14A—with the difference being the difference between the client data and the client server data. In step 18: second server client data are determined—18A—by executing the client difference program on the server client data; updated server data are determined—18B—by executing the client difference program on the server data; a server difference program is generated—18C—that encodes a difference between the updated server data and the second server client data; third server client data are determined—18D—by executing the server difference program on the second server client data; and, the server client data are replaced—18E—with the third server client data. Optionally, a locking process is provided for locking the server data in order to prevent the same from being modified by other processes prior step 18B, which is released, for example, after step 18C. In step 22: second client server data are determined—22A—by executing the server difference program on the client server data; second client data are determined—22B—by executing the server difference program on the client data; the client server data are replaced—22C—with the second client server data; and, the client data are replaced—22D—with the second client data. Optionally, a locking process is provided for locking the client server data and the client data during execution of the steps 22A to 22D.

Figure 6:
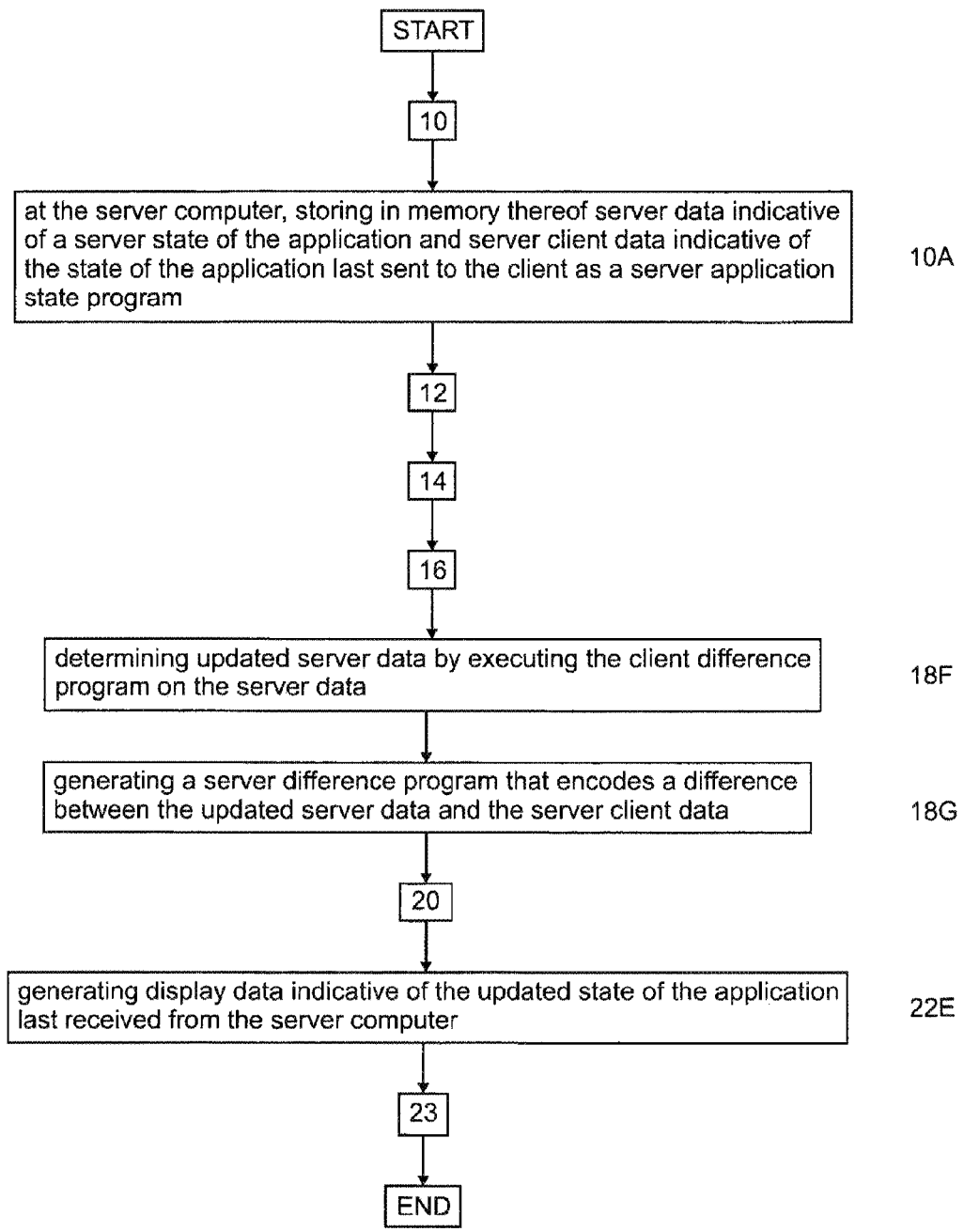
FIG. 6 is a simplified flow diagram of another implementation of the method for providing remote access to a state of an application illustrated in FIG. 2.

Referring to FIG. 6, an alternative implementation of the method for providing remote access to the state of an application is illustrated—with reference to the method shown in FIG. 2. In the memory 106 of the server computer 102 data indicative of a state of the application are stored—10A—in two states thereof: server data indicative of the server state of the application—the state of the application at the server computer (and possibly changed by the server computer); and, server client data indicative of the state of the application last sent to the client computer 110B as a server state application program. In step 18: updated server data are determined—18F—by executing the client difference program on the server data; and, a server difference program is generated 18G—that encodes a difference between the updated server data and the server client data. In step 22 display data indicative of the updated state of the application last received from the server computer are directly generated—22E—by executing the received server difference program and displayed—23—in a human comprehensible fashion on display 116B. This implementation obviates storage of data related to the state of the application in memory of the client computer 110B which is beneficial for client computers having limited storage capacity such as hand held devices. Preferably, a server application state program that has encoded data indicative of the server state of the application is generated and transmitted, as disclosed herein above, to the client computer, for example, in predetermined time intervals.

As is evident to those skilled in the art, the embodiments of the system 100 and method for providing remote access to the state of an application according to the invention have been described with respect to a client-server network architecture comprising two client computers for the sake of simplicity but are not limited thereto and are applicable for other network architectures as well as various numbers of client computers.

The embodiments of the method for providing remote access to the state of an application are performed, for example, by executing executable commands stored in storage mediums—for example, the memory 106 using processor 104 of the server computer 102 and the memory 114A using the processor 112A of the client computer 110A. The executable commands for being stored in the memory of the client computers are, for example, transmitted from the server computer 102 via the communication network 108.

The present invention has been described herein with regard to preferred embodiments. However, it will be obvious to persons skilled in the art that a number of variations and modifications can be made without departing from the scope of the invention as described herein.

What is claimed:

1. An apparatus for remote access to an application program executing on a server computer, comprising:
   a server remote access program executing on the server computer, the server remote access program being in communication with the application program, receiving a communication from a client remote access program that provides the remote access to the application program and executes on a client computer, generating a difference program that contains encoded data indicative of a change in a state of the application program, and communicating the difference program from the server remote access program to the client remote access program,
   wherein the difference program is executed by the client remote access application to synchronize the state of the application program at both the server computer and the client computer, and
   wherein the difference program only captures changes in the state of the application program since the state of the application was last received by the server computer from the client remote access program.

2. The apparatus of claim 1, wherein the change in the state of the application is determined in accordance with execution of the application program.

3. The apparatus of claim 2, further comprising generating view data of the state of the application.

4. The method of claim 3, further comprising generating the view data in accordance with hardware capabilities of the client computer.

5. The apparatus of claim 1, further comprising:
   wherein the change in the state of the application is synchronized between the server computer, the client computer and a second client computer using the difference program.

6. The apparatus of claim 5, wherein an updated state of the application program is displayed at the client computer and the second client computer using the difference program.

7. The apparatus of claim 1, wherein the state of the application is synchronized by processing the encoded data in the difference program.

8. An apparatus for remote access to an application program executing on a server computer, the application program being in communication with a server remote access program executing on the server computer, the apparatus comprising:
   a client remote access program that provides the remote access to the application program and executes on a client computer, the client remote access program remotely accessing the application program by establishing a communication connection with the server remote access program, generating a difference program that contains encoded data indicative of a change in a state of the application program, and communicating the difference program from the client remote access program to the server remote access program, wherein the difference program is executed by the server remote access application to synchronize the state of the application program at both the client computer and the server computer, and wherein the difference program only captures changes in the state of the application program since the state of the application was last received by the client computer from the server remote access program.

9. The apparatus of claim 8, wherein the change in the state of the application is determined in accordance with one of user inputs received at the client computer.

10. The apparatus of claim 8, wherein an updated state of the application program is displayed at the client computer using the difference program.

11. The apparatus of claim 8, further comprising:
a second client remote access program executed on a second client computer, the second client remote access program remotely accessing the application program by establishing a second communication connection with the server remote access program, wherein the difference program further contains data representing a change in the state of the application made by the second client computer, and wherein the change in the state of the application is synchronized between the server computer, the client computer and the second client computer using the difference program.

12. The apparatus of claim 11, wherein an updated state of the application program is displayed at the client computer and the second client computer using the difference program.

13. The apparatus of claim 8, wherein the state of the application is synchronized by processing the encoded data in the difference program.

14. An apparatus for remote access to an application program executing on a server computer, comprising:
a server remote access program that provides the remote access to the application program and executes on the server computer, the server remote access program being in communication with the application program, generating a server difference program that contains encoded data indicative of a change in a state of the application program, and communicating the server difference program from the server remote access program to a client remote access program that executes the server difference program to synchronize the state of the application at both the server computer and a client computer; and the client remote access program that provides the remote access to the application program and executes on the client computer, the client remote access program remotely accessing the application program by establishing a communication connection with the server remote access program, generating a client difference program that contains encoded data indicative of a change in a state of the application program, and communicating the client difference program from the client remote access program to the server remote access program that executes the client difference program to synchronize the state of the application at both the client computer and the server computer, wherein the server difference program and the client difference program each only capturing changes in the state of the application program since the state of the application was last received by the server computer and the client computer, respectively.

15. The apparatus of claim 14, wherein the change in the state of the application is determined in accordance with one of user inputs received at the client computer or execution of the application program.

16. The apparatus of claim 14, wherein an updated state of the application program is displayed at the client computer using the server difference program.

17. The apparatus of claim 14, further comprising:
a second client remote access program executed on a second client computer, the second client remote access program remotely accessing the application program by establishing a second communication connection with the server remote access program, wherein the client difference program further contains data representing a change in the state of the application made by the second client computer, and wherein the change in the state of the application is synchronized between the server computer, the client computer and the second client computer using the client difference program.

18. The apparatus of claim 17, wherein an updated state of the application program is displayed at the client computer and the second client computer using the client difference program.

19. The apparatus of claim 14, wherein the state of the application is synchronized by processing the encoded data in the server difference program and the client difference program.

20. The apparatus of claim 19, wherein the encoded data are indicative of at least one of a path to the change in the state of the application, a type of the change, and a value of the change.

* * * * *